United States Patent [19]

Gale

[11] Patent Number: 5,718,037
[45] Date of Patent: Feb. 17, 1998

[54] SPLICE BLOCK MOVER

[76] Inventor: Ted L. Gale, 2450 Judy La., Shelby Township, Mich. 48316

[21] Appl. No.: 644,040

[22] Filed: May 9, 1996

[51] Int. Cl.[6] .................................................. H01R 43/00
[52] U.S. Cl. .................... 29/755; 29/758; 29/760; 29/828; 29/868; 269/2; 269/903
[58] Field of Search .................. 29/33 F, 56.6, 29/235, 267, 745, 755, 758, 760, 868, 869, 828; 269/2, 45, 97, 299, 903

[56] References Cited

U.S. PATENT DOCUMENTS

| | | | |
|---|---|---|---|
| 2,691,212 | 10/1954 | Hildebrand | 29/239 |
| 3,528,155 | 9/1970 | Marshall | 269/2 X |
| 3,665,574 | 5/1972 | Brown et al. | 29/755 |
| 3,725,580 | 4/1973 | Thompson et al. | 174/38 |
| 3,742,564 | 7/1973 | Dyksterhouse | 29/56.6 |
| 3,890,689 | 6/1975 | Copas | 29/203 |
| 3,992,569 | 11/1976 | Hankins et al. | 174/92 |
| 4,308,661 | 1/1982 | Hallstrom, Jr. | 29/764 |
| 4,416,506 | 11/1983 | Johnson et al. | 29/267 X |
| 4,512,828 | 4/1985 | Helm | 156/49 |
| 4,646,433 | 3/1987 | Le Houerou et al. | 29/755 |
| 5,103,554 | 4/1992 | Homefeld | 29/753 |
| 5,337,548 | 8/1994 | Kelly | 29/235 X |
| 5,401,010 | 3/1995 | Haswell et al. | 269/903 X |

FOREIGN PATENT DOCUMENTS

| | | | |
|---|---|---|---|
| 1347202 | 10/1987 | U.S.S.R. | 29/755 |
| 1517238 | 10/1991 | U.S.S.R. | 29/755 |

*Primary Examiner*—Peter Vo
*Attorney, Agent, or Firm*—Young & Basile, P.C.

[57] ABSTRACT

A portable, lightweight apparatus for moving a splice body with respect to a cable includes a first clamp member for engaging the cable, a second clamp member for engaging the splice body and a mechanism for moving the first clamp member and the second clamp member with respect to one another. The moving mechanism can include at least one gear rack extending between the first and second clamp members, and a pinion gear operably engageable with the rack. Sheathing can be provided for the rack between the first clamp member and the second clamp member to prevent entry of foreign material into teeth of the rack. In addition, an enclosure can be provided for housing a portion of the elongated rack extending outwardly beyond the first or second clamp members to prevent entry of foreign material into the teeth of the rack.

22 Claims, 6 Drawing Sheets

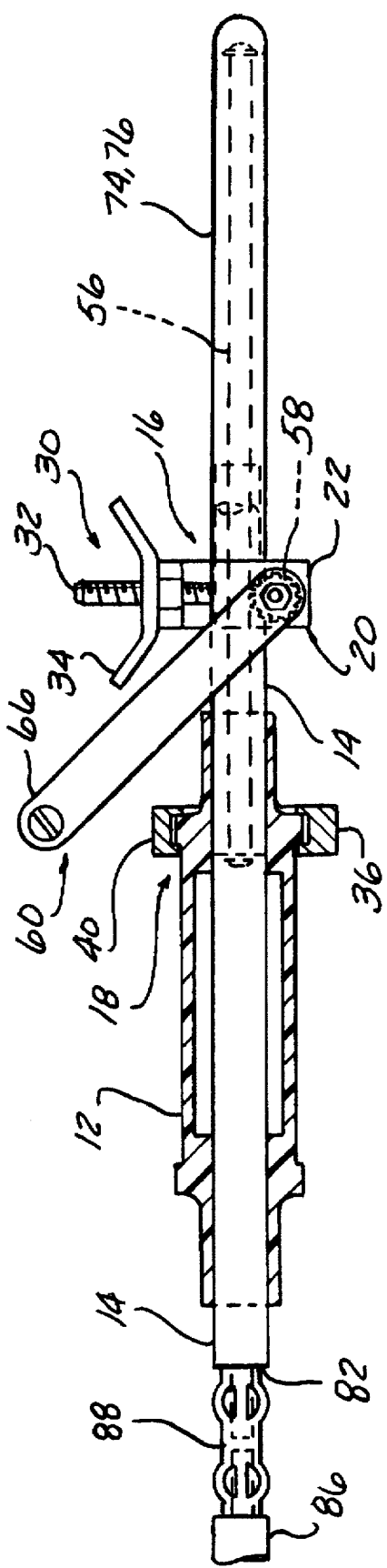
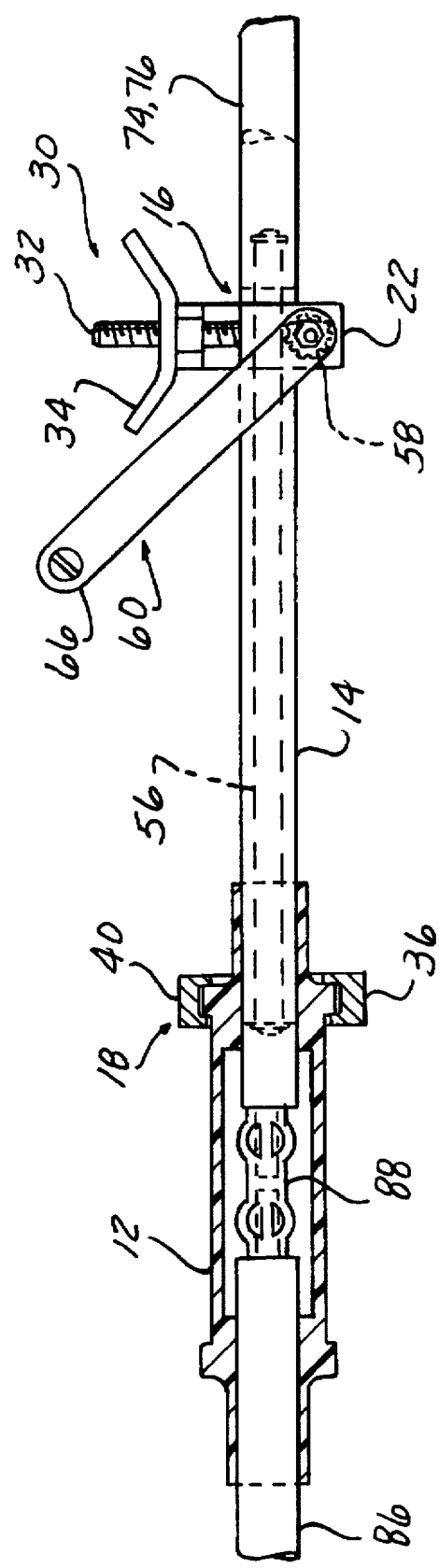
FIG-6
FIG-7

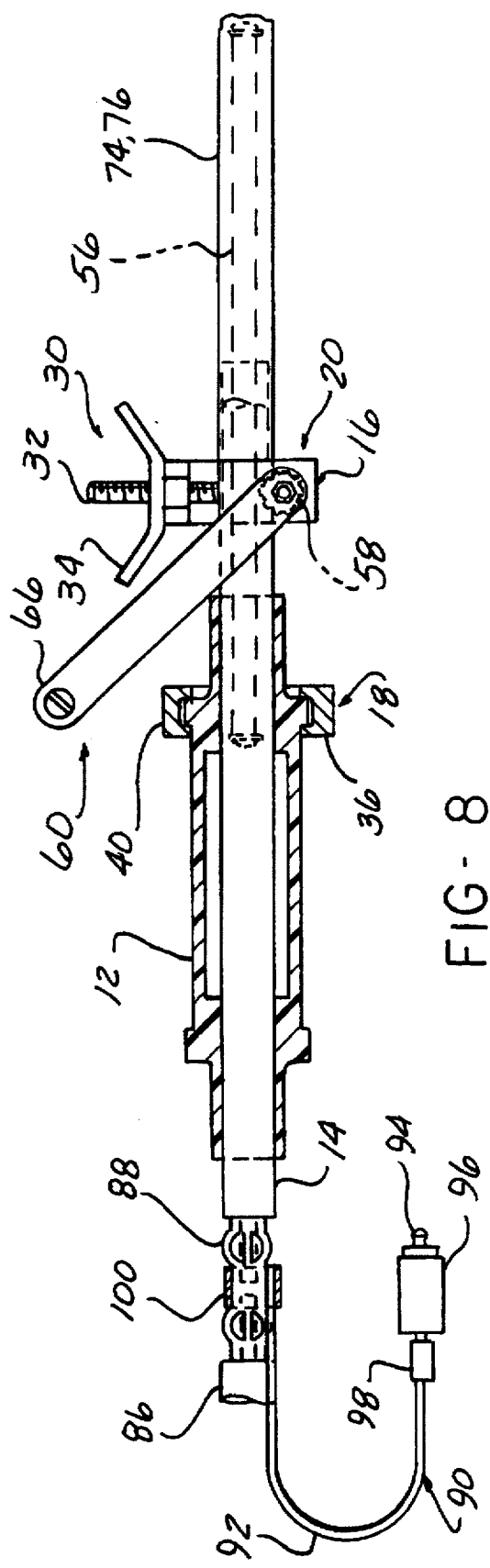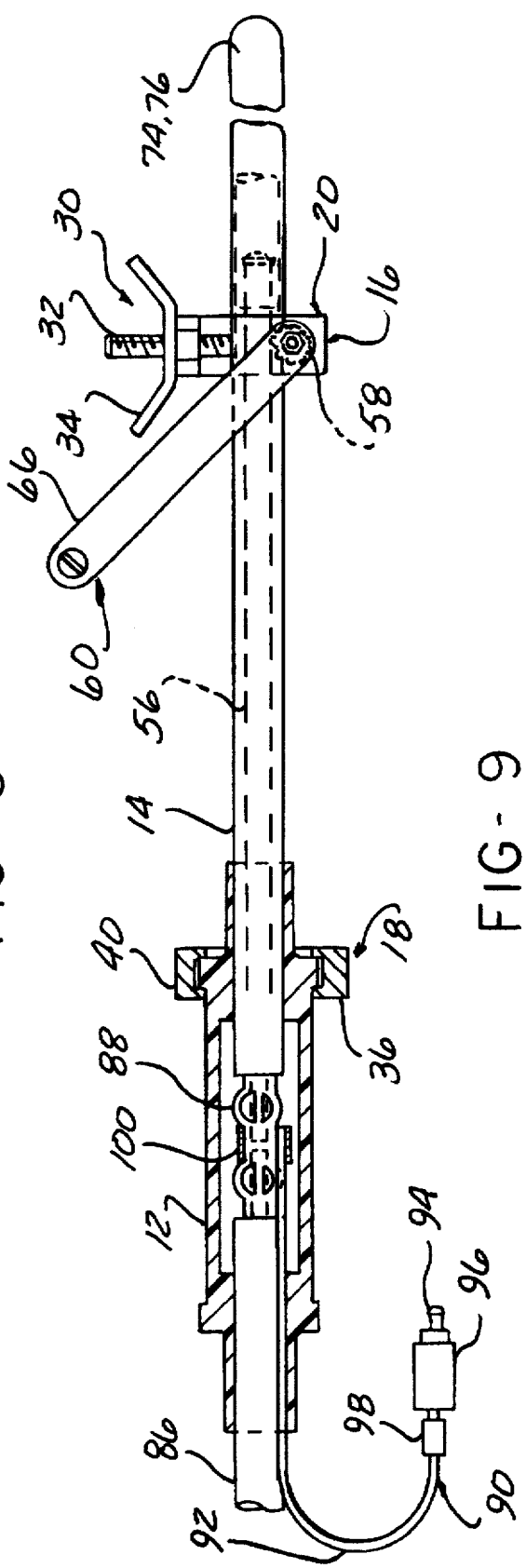

SPLICE BLOCK MOVER

FIELD OF THE INVENTION

The invention relates to an apparatus for moving a splice block body with respect to an electrical cable, and more particularly, to pushing the splice body onto an electrical cable allowing the cable to be spliced to another cable and then moving the splice body to cover the spliced joint in above ground and underground installations.

BACKGROUND OF THE INVENTION

Currently, electrical cable repair personnel manually manipulate a splice body with respect to a cable when performing repairs on broken or damaged cables. In order to form a water tight connection, the splice body is manufactured to fit with close tolerance around the outer diameter of the cable to be repaired. This requires great strength and effort to move the splice body longitudinally with respect to the cable in order to initially place the splice body on the cable prior to splicing, and thereafter to move the splice body over the spliced joint area. It has been found over time that electrical cable repair personnel can suffer medical problems as a direct result of the effort required to move the splice body with respect to the cable. One such medical problem encountered is commonly referred to as carpal tunnel syndrome and another is tendinitis of the elbow.

Various devices have previously been proposed for cable holding and positioning in order to perform a splicing operation. However, these devices generally are very large and bulky in construction. Therefore, these devices are not suitable for use during repairs in the field, since they are not easily transported to the location where the cable repair is required, and cannot easily be relocated in an underground trench or elevated to an above ground location where the repair actually takes place.

In splicing cables it is necessary to expose the metallic conductors covered by the sheath to provide the desired connections. In order to protect the exposed conductors against deterioration caused by moisture, gases or other contaminants, and to protect against electrical short circuiting, it is necessary to reseal the individual conductors with electrically insulative material, such as an electrician's tape, insulative sleeves and the like. In severely hostile environments, or in applications where the cable will be permitted to remain undisturbed for long periods of time, these insulators are known to break down and deteriorate with the resulting failure of the cable. It is thus necessary to provide a protective enclosure to prevent this occurrence. Many devices and methods are known for providing enclosures for cables subjected to a hostile environment, e.g. excess moisture, pressure from the surrounding soil in subterranean cables and the like. Both rigid and flexible enclosures have been provided in the past for this purpose. Such protective enclosures share in common the purpose of providing a controlled enclosed environment for a small section of a cable and are typically employed to protect exposed connections, one or more temporary or permanent cable splices and similar interruptions in the continuity in the customarily provided protective cable sheath. If the protective enclosure is not properly sealed and kept water tight, it has been found that the protective enclosure and cable splice are prone to a higher rate of failure in the field than the original protective cable sheath and conductor.

SUMMARY OF THE INVENTION

It is desirable in the present invention to provide a small, portable apparatus for moving a splice body with respect to a cable. It is also desirable for the apparatus to be easily transported and located in the field either in a trench below ground, at ground level or in a basket elevated above ground level, wherever the cable splicing needs to be performed. It is desirable in the present invention to provide an apparatus that eliminates, or greatly reduces, the amount of strength and effort required to move a splice body with respect to a cable in order to reduce the medical problems associated with this activity. In addition, it is desirable in the present invention to provide a method of ensuring complete sealing of the splice body with respect to the cable in order to decrease the failure rate of spliced joints.

An apparatus according to the present invention for moving a splice body with respect to a cable includes first means for clamping the cable, second means for clamping the splice body, and means for moving the first clamping means and the second clamping means with respect to one another.

In the preferred embodiment, the moving means includes first and second elongated gear racks extending in parallel with respect to one another between the first clamping means and the second clamping means. A pinion gear is operably engageable with the first and second racks to move the first clamping means and the second clamping means with respect to one another. The pinion gear is rotatably connected to one of the first clamping means and the second clamping means. Drive means is provided for driving the pinion gear in rotation while in operable engagement with the first and second racks for moving the first clamping means and the second clamping means with respect to one another.

In the preferred embodiment, the first clamping means includes a cable holder having a cable-receiving surface formed thereon. A first swing gate is pivotally mounted to the cable holder for operably engaging a cable interposed between the first swing gate and the cable-receiving surface of the cable holder. The first swing gate has a cable-engaging surface formed thereon. Compression means is provided engageable with the swing gate for clamping the cable interposed between the cable-receiving surface and the cable-engaging surface.

In the preferred embodiment, the second clamping means can include a splice body holder having a body-receiving surface formed thereon. A second swing gate pivotally mounts to the splice body holder for operably engaging a splice body interposed between the second swing gate and the body-receiving surface of the splice body holder. The second swing gate has a body-engaging surface formed thereon. Retainer means is provided engageable with the second swing gate for retaining the splice body interposed between the body-receiving surface and the body-engaging surface.

By clamping the cable with one member, and the splice body with another member and then providing a mechanism that can be operated in order to move the first clamping member with respect to the second clamping member, it is possible to provide a more mechanically efficient and less stressful means of performing the previous operation that was performed manually by pushing the splice body onto a splice cable, staking a second cable to the first cable and pulling the splice body back longitudinally to cover the spliced joint. The first and second clamp members according to the present invention can be moved relative to one another using either a handle or crank, or can be power driven by electrical or air driven rotating tools if they are available on site. This eliminates or greatly reduces the amount of physical effort and muscle strain previously required in order to move the splice body with respect to the cable. The present invention is therefore capable of eliminating, or greatly reducing, the incidents of carpal tunnel syndrome and tendinitis of the elbow, which have sometimes resulted from manual manipulation of the splice body with respect to the cable in the past.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIG. 6 is a cross-sectional view with the splice body and cable locked into the apparatus and moved from the first position illustrated in FIG. 5 to a second position with the splice body moved completely onto the cable;

FIG. 7 is a cross-sectional view of the apparatus with the splice body moved to a third position covering the spliced joint between two cable ends;

FIG. 8 is a cross-sectional view of the apparatus used in combination with a dispenser device in accordance with an optional method according to the present invention for sealing the splice body with respect to the cable in a water tight fashion; and FIG. 9 is a cross-sectional view of the apparatus with the splice body moved to the third position and the dispenser communicating with the internal chamber defined by the splice body straddling the spliced joint prior to injecting silicone.

DESCRIPTION OF THE PREFERRED EMBODIMENT

Figure 1:
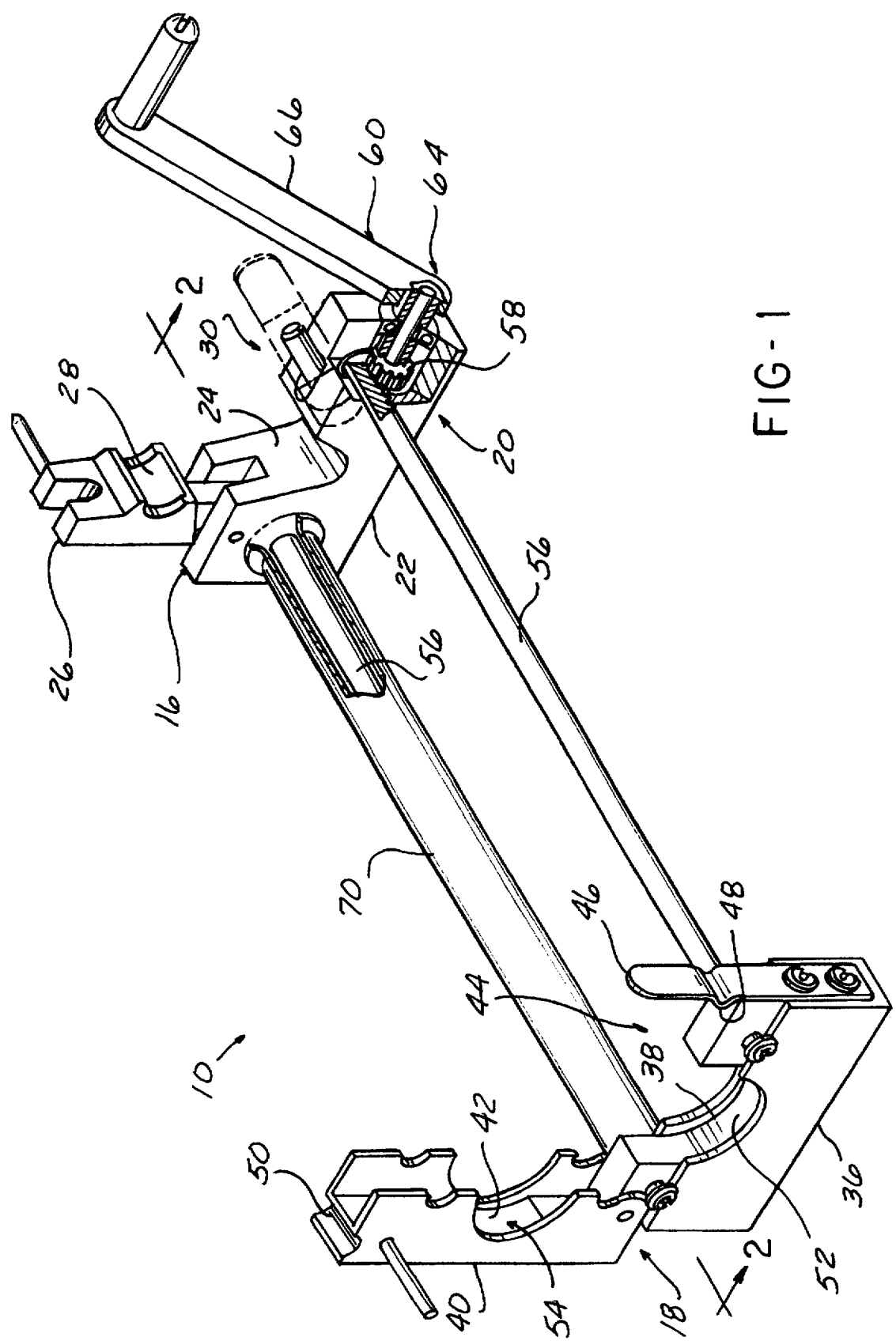
FIG. 1 is a perspective view of an apparatus according to the present invention in an open position before loading with various portions not shown, or shown cross-section to illustrate various details of the construction.
Figure 2:
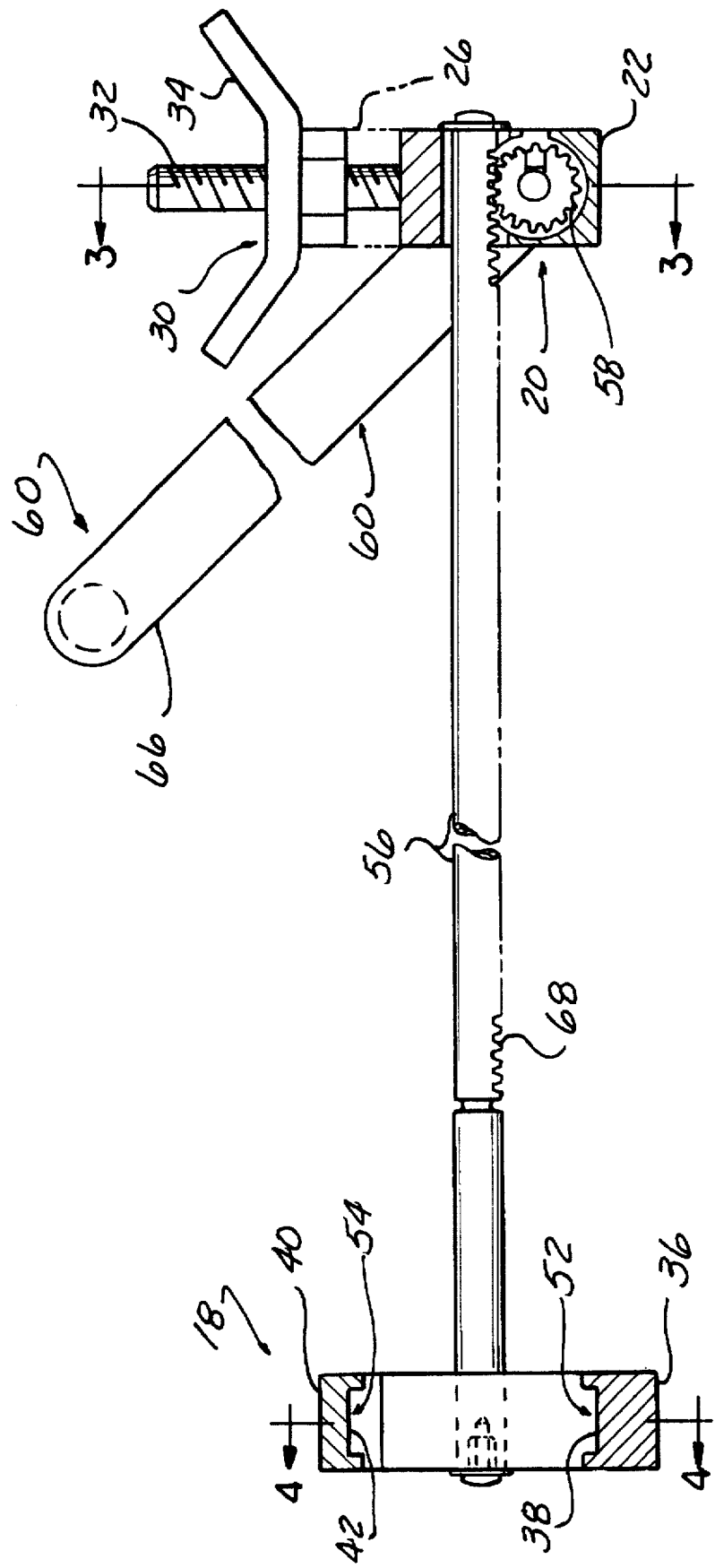
FIG. 2 is a cross-sectional view of the apparatus taken as shown in FIG. 1.

An apparatus or hand held fixture 10 according to the present invention can be used to move a splice body 12 (seen in FIGS. 5–9) with respect to a cable 14 (seen in FIGS. 5–9). Referring now to FIGS. 1–4, the apparatus 10 includes first means 16 for clamping the cable 14, second means 18 for clamping the splice body 12, and means 20 for moving the first means 16 and the second means 18 with respect to one another.

In the preferred configuration, the first means 16 can include a cable holder 22 having a cable-receiving surface 24 formed thereon. A first swing gate 26 is pivotally mounted to the cable holder 22 for operably engaging a cable 14 interposed between the first swing gate 26 and the cable-receiving surface 24 of the cable holder 22. The first swing gate 26 has a cable-engaging surface 28 formed thereon.

Compression means 30 can be provided engageable with the first swing gate 26 for clamping the cable 14 interposed between the cable-receiving surface 24 and the cable-engaging surface 28. The compression means 30 can include a movable bolt 32 connected to the cable holder 22 and movable into engagement with the first swing gate 26 when in a cable-engaging position (as seen in FIGS. 2, 3 and 5–9). A wing nut 34 or the like is operably engageable with the bolt 32 to drive the first swing gate 26 toward the cable holder 22 to clamp the cable 14 therebetween.

The second means 18 can include splice body holder 36 having a body-receiving surface 38 formed thereon. A second swing gate 40 can be pivotally mounted to the splice body holder 36 for operably engaging the splice body 12 interposed between the second swing gate 40 and the body-receiving surface 38 of the splice body holder 36. The second swing gate 40 can have a body-engaging surface 42 formed thereon.

Retainer means 44 can be provided engageable with the second swing gate 40 for retaining the splice body 12 interposed between the body-receiving surface 38 and the body-engaging surface 42. The retainer means 44 can include an elongated, resilient biasing member 46 having a detent 48 formed thereon adjacent one end. A corresponding aperture or groove 50 can be formed on an opposing surface of the second swing gate 40 for releasibly receiving the detent 48 therein when the swing gate 40 is in the splice body-engaging position (seen in FIGS. 2 and 4–9). The retainer means 44 can also include the body-receiving surface 38 defined by a first annular slot 52 formed in the splice body holder 36 for extending along at least a portion of a periphery of the splice body 12. In addition, the retainer means 44 can include the body-engaging surface 42 defined by a second annular slot 54 formed in the second swing gate 40 for extending along a complimentary portion of the periphery of the splice body 12, so that the first and second annular slots, 52 and 54 respectively, can captively hold a splice block 12 disposed therebetween during movement of the first means 16 and the second means 18 with respect to one another.

The moving means 20 according to the present invention can include at least one elongated gear rack 56 extending between the first means 16 and the second means 18, and a pinion gear 58 operably engageable with the rack 56 to move the first means 16 and the second means 18 with respect to one another. Preferably, the pinion gear 58 is rotatably connected to one of the first means 16 and the second means 18.

Drive means 60 can be provided for driving the pinion gear 58 in rotation while in operable engagement with the rack 56 for moving the first means 16 and the second means 18 with respect to one another. The drive means 60 can include a hex-shaped driver nut 62 connected to the pinion gear 58 with a common axis of rotation for driving the pinion gear 58 in rotation. The driver nut 62 is operably engageable with a nut-driver 64 to rotate the pinion gear 58 with respect to the common axis of rotation. The drive means 60 can also include a handle 66 connectible to the pinion gear 58 for driving the pinion gear 58 in rotation. The handle 66 can be permanently or releasibly connected to the pinion gear, or a hex-shaped drive nut 62 can be engageable with a powered nut-driver 64. A rachet wrench or the handle 66 can define a nut-driver 64 when engageable with a hex-shaped driver nut 62 in order to drive the pinion gear 58 in rotation. The hex-shaped driver nut 62 can also be driven by automated or powered nut-drivers 64, such as pneumatic or electric powered rotational driving equipment, nut drivers or the like.

In order to prevent entry of foreign matter into the teeth 68 of the rack 56, it is desirable in the present invention to provide sheathing means 70 for enclosing the rack 56 between the first means 16 and the second means 18. The sheathing means 70 can take the form of a plastic dirt shield 72, or other telescopic, or expandable and retractable sheathing member connected to the first means 16 at one end and the second means 18 at an opposite end.

Enclosure means 74 can also be provided for housing a portion of the elongated rack 56 extending outwardly beyond one of the first means 16 and the second means 18 to prevent entry of foreign matter into teeth 68 of the rack 56. The enclosure means 74 can be of a rigid, or semi-rigid form, such as a hollow cylindrical tube 76 closed at the outer end, or a flexible plastic or other material preferably impervious to the entry of dirt and dust, such as a flexible bag-like member.

Figure 3:
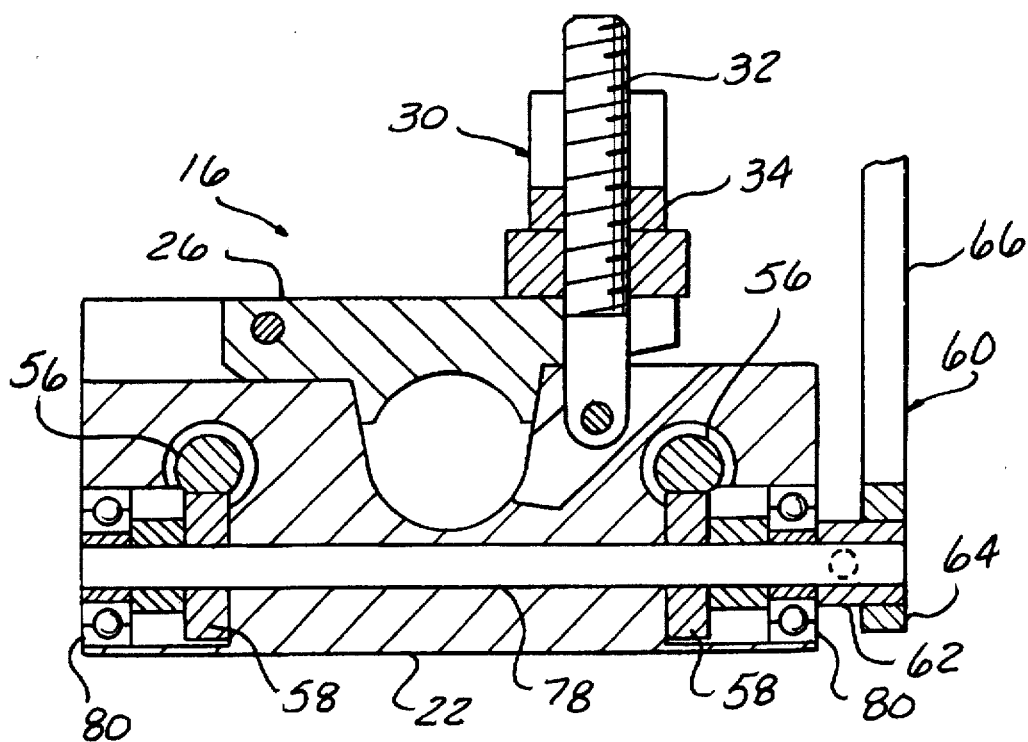
FIG. 3 is a cross-sectional view of the cable holder portion of the apparatus taken as shown in FIG. 2.
Figure 4:
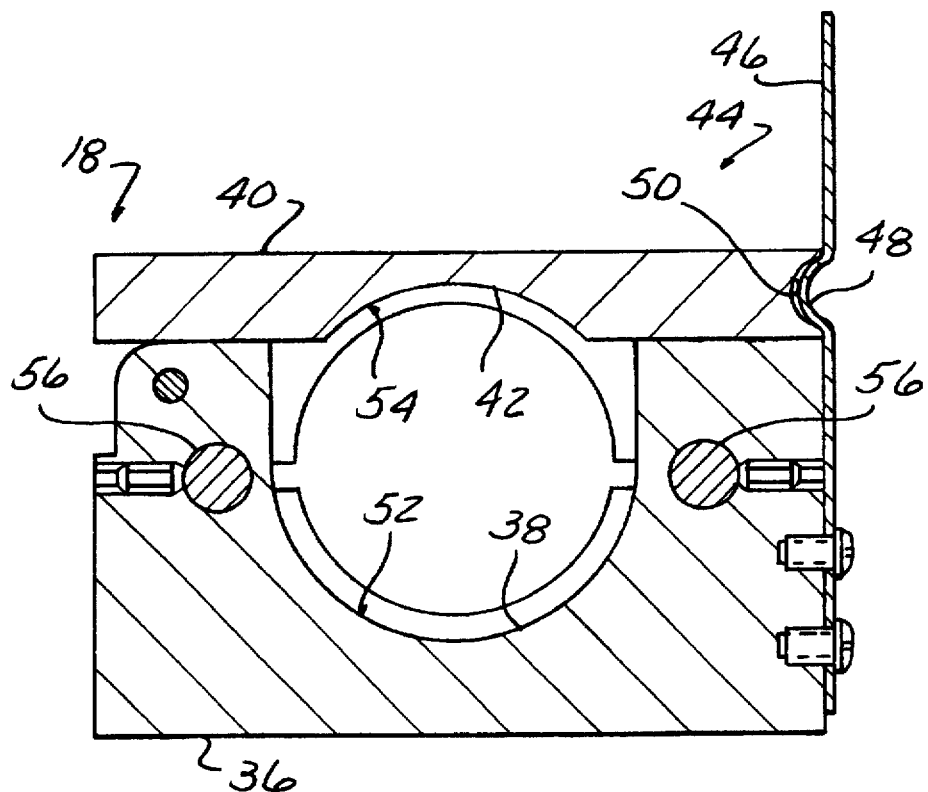
FIG. 4 is a cross-sectional view of the splice body holder portion of the apparatus taken as shown in FIG. 2.

In the preferred form, the moving means includes first and second elongated racks 56 extending in parallel with respect to one another between the first clamping means 16 and the second clamping means 18. The pinion gear 58 is operably engageable with the first and second racks 56 to move the first means 16 and the second means 18 with respect to one another. The pinion gear 58 is preferably rotatably connected to one of the first means 16 and the second means 18. As illustrated in the drawings, the pinion gear 58 is connected to the first clamping means 16. The pinion gear 58 may be in the form of a single gear operably engaging both the first and second racks 56, or may be two separate pinion gears 58 as seen in FIG. 3 connected to a common shaft 78 for rotation therewith. The shaft 78 can be mounted for rotation with respect to the cable holder 22 by bearing members 80, such as roller bearings. In the illustrated configuration, one end of each elongated gear rack 56 is fixedly connected to the splice body holder 36, so that in response to rotation of the pinion gear 58, the splice body holder 36 is moved with respect to the cable holder 22 through the first and second gear racks 56.

Figure 5:
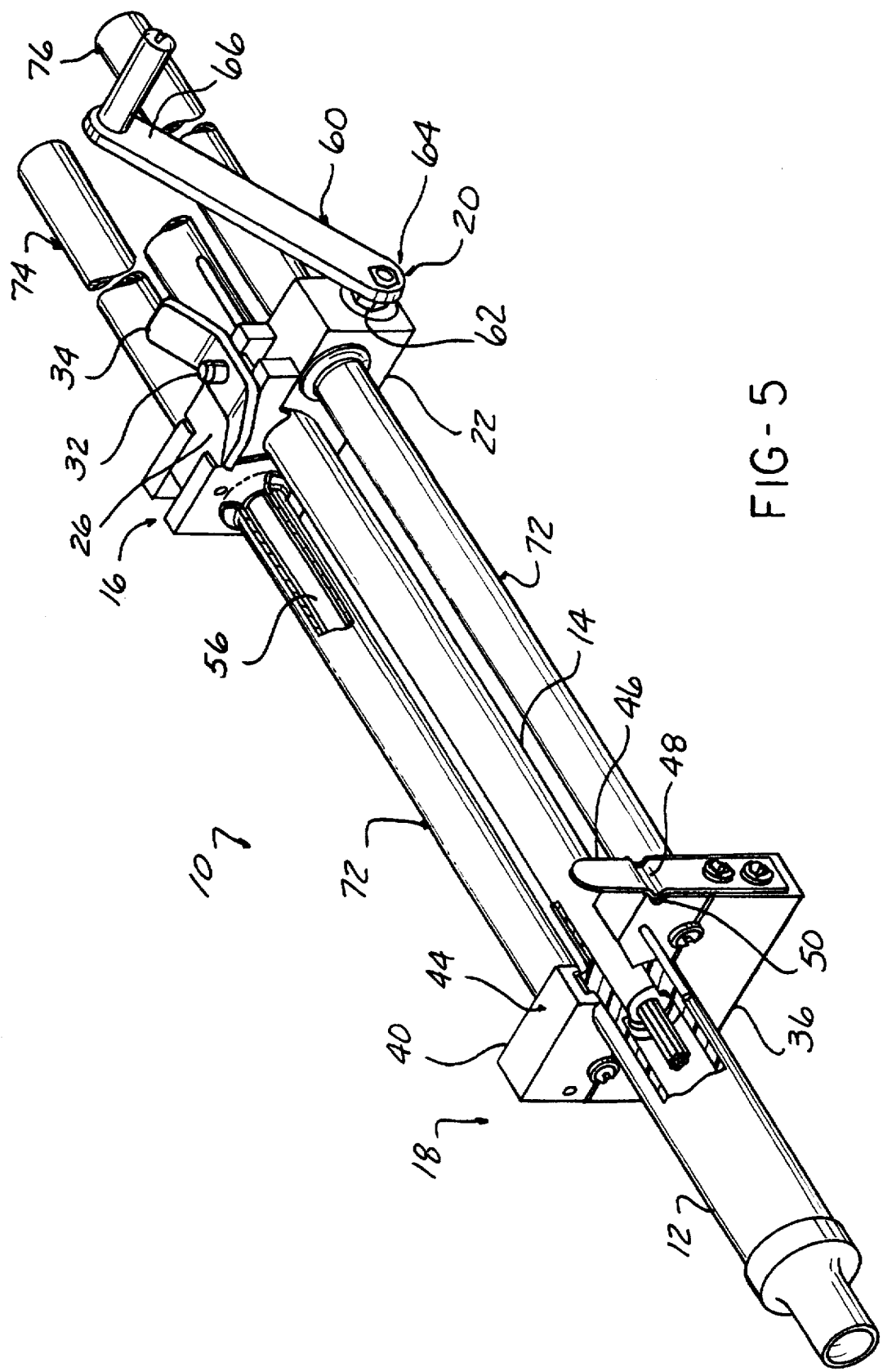
FIG. 5 is a perspective view of the apparatus according to the present invention in a first position after loading a cable and a splice body.

Referring now to FIG. 5, the apparatus 10 according to the present invention is shown in perspective view with various portions cut away for clarity, and showing the first swing gate in the cable-engaging position with a cable disposed between the cable holder 22 and the first swing gate 26, and the second swing gate 40 in the splice body engaging position with a splice body 12 disposed between the second swing gate 40 and the splice body holder 36. FIG. 5 illustrates the initial or first position of the apparatus 10, where the apparatus 10 is operably positioned and clamped with respect to the cable 14 and the splice body 12 for moving the splice body 12 with respect to the cable 14. Applying rotational force to the pinion gear 58 in the clockwise direction of the illustration, causes the apparatus 10 to assume the second position shown in FIG. 6. In the second position, the rotation of the pinion gear 58 in operable engagement with the gear rack 56 has moved the splice body holder 36 and connected splice body 12 longitudinally along the cable 14 with respect to the cable holder 22, so that the splice body 12 is now positioned completely over the cable 14 with an exposed end 82 of the cable 14 disposed outside of the splice body 12 with the cable 14 extending all the way through the splice body 12. The exposed end 82 of the cable 14 can then be spliced by conventional means to a second exposed end of a second cable 86, using a splice connector 88 as is conventional in the art. After completion of the splice connection, the pinion gear 58 can be driven in the opposite rotational direction, counterclockwise in the illustration, in order to drive the splice body holder 36 away from the cable holder 22. The splice body 12 is driven longitudinally along the cable 14 in response to the operable engagement of the pinion gear 58 with the gear rack 56 in order to drive the splice body 12 over the spliced connector 88, so that the spliced joint is completely housed within the splice body 12 as illustrated in FIG. 7. The first swing gate 26 and second swing gate 40 can then be released in order to remove the apparatus 10 from operable engagement with the splice body 12 and cable 14.

Referring now to FIGS. 8 and 9, in applications where it is desirable to achieve a water tight encapsulation or covering of the spliced joint, dispenser means 90 according to the present invention can also be provided. The dispenser means 90 can include a flexible plastic tube 92 of a predetermined length connected to a standard Zerk fitting 94. The connection between the tube 92 and the fitting 94 can be accomplished using a brass fitting 96 and coupling 98 or any other suitable connectors. According to the optional use of dispenser means according to the present invention, the operation would include connecting the end of the tube 92 opposite from the fitting 96 to the splice connector 88 using an appropriate fastener 100, such as electrical tape while the splice body 12 is in the second position as illustrated in FIG. 8. By rotating the pinion gear 58 in the required rotational direction in operable engagement with the gear 56, the splice body holder 36 is driven away from the cable holder 22 to position the splice body 12 over the splice connector 88 with the plastic tube 92 passing from the interior of the chamber defined by the splice body 12 with the Zerk fitting external of the splice body 12. A suitable water-resistant material, such as silicone or the like, is then dispensed through the fitting and tubing into the interior of the splice body 12 displacing all of the air trapped within the chamber defined by the splice body 12 and the cable 14 and second cable 86. Once the material has been dispensed into the chamber of the splice body and begins to appear at the outer ends, the dispenser means can be pulled out of the splice body 12 allowing the material to cure and providing a water tight seal comparable to the original protective cable sheath.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An apparatus for moving a splice body with respect to a cable comprising:

first means for clamping said cable;

second means for clamping said splice body;

means for mechanically driving movement of said splice body held by said second means with respect to said cable held by said first means; and dispenser means for introducing a water-resistant material into a chamber defined by said splice body and cable, when said splice body is disposed over a spliced joint in said cable, wherein said dispenser means includes a flexible, elongated tube releasibly connectible to a splice connector of said spliced joint prior to positioning said splice body over said spliced joint, such that after positioning said spliced body over said spliced joint, said flexible tube extends with one end opening into said chamber defined by said splice body and said cable, and an opposite end is disposed external to said splice body, wherein said flexible tube is removable from said spliced joint after introduction of said water-resistant material, and fitting means for releasibly connecting a container of water-resistant material to said chamber.

2. An apparatus for moving a splice body with respect to a cable comprising:

first means for clamping said cable;

second means for clamping said splice body; and means for moving said first means and said second means with respect to one another, wherein said moving means includes at least one elongated gear rack extending between said first means and said second means, and a pinion gear operably engageable with said rack to move said first means and said second means with respect to one another.

3. The apparatus of claim 2 wherein said moving means further comprises:

said pinion gear rotatably connected to one of said first means and said second means.

4. The apparatus of claim 2 wherein said moving means further comprises:

drive means for driving said pinion gear in rotation while in operable engagement with said rack for moving said first means and said second means with respect to one another.

5. The apparatus of claim 4 wherein said drive means further comprises:

a hex-shaped driver nut connected to said pinion gear with a common axis of rotation for driving said pinion gear in rotation, said driver nut operably engageable by a nut-driver to rotate said pinion gear with respect to said common axis of rotation.

6. The apparatus of claim 4 wherein said drive means further comprises:

a handle connectible to pinion gear for driving said pinion gear in rotation.

7. The apparatus of claim 2 further comprising:

sheathing means for enclosing said at least one elongated rack between said first means and said second means to prevent entry of foreign matter into teeth of said rack.

8. The apparatus of claim 2 further comprising:

enclosure means for housing a portion of said at least one elongated rack extending outwardly beyond one of said first means and said second means to prevent entry of foreign matter into teeth of said rack.

9. An apparatus for moving splice body with respect to a cable comprising:

first means for clamping said cable, wherein said first means includes a cable holder having a cable-receiving surface formed thereon and a first swing gate pivotally mounted to said cable holder for operably engaging a cable interposed between said first swing gate and said cable-receiving surface of said cable holder, said first swing gate having a cable-engaging surface formed thereon;

second means for clamping said splice body and means for moving said first means and said second means with respect to one another.

10. The apparatus of claim 9 further comprising:

compression means engageable with said first swing gate for clamping said cable interposed between said cable-receiving surface and said cable-engaging surface.

11. The apparatus of claim 10 wherein said compression means further comprises:

a moveable bolt connected to said cable holder and moveable into engagement with said first swing gate when in a cable engaging position; and a wing nut operably engageable with said bolt to drive said first swing gate toward said cable holder to clamp said cable therebetween.

12. An apparatus for moving a splice body with respect to a cable comprising:

first means for clamping said cable;

second means for clamping said splice body, wherein said second means includes a splice body holder having a body-receiving surface formed thereon and a second swing gate pivotally mounted to said splice body holder for operably engaging a splice body interposed between said second swing gate and said body-receiving surface of said splice body holder, said second swing gate having a body-engaging surface formed thereon; and means for moving said first means and said second means with respect to one another.

13. The apparatus of claim 12 further comprising:

retainer means engageable with said second swing gate for retaining said splice body interposed between said body-receiving surface and said body-engaging surface.

14. The apparatus of claim 13 wherein said retainer means further comprises:

said body-engaging surface defined by a first annular slot formed in said splice body holder for extending along at least a portion of a periphery of said splice body; and said body-receiving surface defined by a second annular slot formed in said second swing gate for extending along a complimentary portion of the periphery of a splice body, such that first and second annular slots can captively hold a splice block therebetween during movement of said second means with respect to said first means.

15. An apparatus for moving a splice body with respect to a cable comprising:

first means for clamping said cable;

second means for clamping said splice body; and means for moving said first means and said second means with respect to one another, said moving means including first and second elongated gear racks extending in parallel with respect to one another between said first means and said second means, a pinion gear operably engageable with said first and second racks to move said first means and said second means with respect to one another, said pinion gear rotatably connected to one of said first means and said second means, and drive means for driving said pinion gear in rotation while in operable engagement with said first and second racks for moving said first means and said second means with respect to one another.

16. The apparatus of claim 15 further comprising:

sheathing means for enclosing said first and second elongated racks between said first means and said second means to prevent entry of foreign matter into teeth of said racks; and enclosure means for housing a portion of said first and second elongated racks extending outwardly beyond one of said first means and said second means to prevent entry of foreign matter into teeth of said racks.

17. The apparatus of claim 15 wherein said first means further comprises:

a cable holder having a cable-receiving surface formed thereon;

a first swing gate pivotally mounted to said cable holder for operably engaging a cable interposed between said first swing gate and said cable-receiving surface of said cable holder, said first swing gate having a cable-engaging surface formed thereon; and compression means engageable with said first swing gate for clamping said cable interposed between said cable-receiving surface and said cable-engaging surface.

18. The apparatus of claim 15 wherein said second means further comprises:

a splice body holder having a body-receiving surface formed thereon;

a second swing gate pivotally mounted to said splice body holder for operably engaging a splice body interposed between said second swing gate and said body-receiving surface of said splice body holder, said second swing gate having a body-engaging surface formed thereon; and retainer means engageable with said second swing gate for retaining said splice body interposed between said body-receiving surface and said body-engaging surface.

19. The apparatus of claim 18 wherein said retainer means further comprises:

said body-engaging surface defined by a first annular slot formed in said splice body holder for extending along at least a portion of a periphery of said splice body; and said body-receiving surface defined by a second annular slot formed in said second swing gate for extending along a complimentary portion of the periphery of a splice body, such that first and second annular slots can captively hold a splice block therebetween during movement of said second means with respect to said first means.

20. An apparatus for moving a splice body with respect to a cable comprising:

a cable holder having a cable-receiving surface formed thereon;

a first swing gate pivotally mounted to said cable holder for operably engaging a cable interposed between said first swing gate and said cable-receiving surface of said cable holder, said first swing gate having a cable-engaging surface formed thereon;

compression means engageable with said first swing gate for clamping said cable interposed between said cable-receiving surface and said cable-engaging surface;

a splice body holder having a body-receiving surface formed thereon;

a second swing gate pivotally mounted to said splice body holder for operably engaging a splice body interposed between said second swing gate and said body-receiving surface of said splice body holder, said second swing gate having a body-engaging surface formed thereon;

retainer means engageable with said second swing gate for retaining said splice body interposed between said body-receiving surface and said body-engaging surface; and means for moving said cable holder and said splice body holder with respect to one another.

21. The apparatus of claim 20 further comprising:

dispenser means for introducing a water-resistant material into a chamber defined by said splice body and cable, when said splice body is disposed over a spliced joint in said cable.

22. The apparatus of claim 21 wherein said dispenser means further comprises:

a flexible, elongated tube releasibly connectible to a splice connector of said spliced joint prior to positioning said splice body over said spliced joint, such that after positioning said spliced body over said spliced joint, said flexible tube extends with one end opening into said chamber defined by said splice body and said cable, and an opposite end is disposed external to said splice body, wherein said flexible tube is removable from said spliced joint after introduction of said water-resistant material; and fitting means for releasibly connecting a container of water-resistant material to said chamber.

* * * * *